United States Patent
Son et al.

(10) Patent No.: US 11,522,870 B2
(45) Date of Patent: Dec. 6, 2022

(54) METHOD FOR URL ANALYSIS AND ELECTRONIC DEVICE THEREOF

(71) Applicant: Samsung Electronics Co., Ltd, Suwon-si (KR)

(72) Inventors: Dong-Il Son, Seongnam-si (KR); Hyun-Jung Kim, Seoul (KR); Sun-Kee Lee, Seongnam-si (KR); Jin-Gil Yang, Suwon-si (KR); In-Ji Jin, Bucheon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 558 days.

(21) Appl. No.: 16/209,774

(22) Filed: Dec. 4, 2018

(65) Prior Publication Data

US 2019/0109862 A1    Apr. 11, 2019

Related U.S. Application Data

(63) Continuation of application No. 14/484,216, filed on Sep. 11, 2014, now abandoned.

(30) Foreign Application Priority Data

Sep. 11, 2013   (KR) .................. 10-2013-0109099

(51) Int. Cl.
*H04L 29/06* (2006.01)
*H04L 9/40* (2022.01)
(Continued)

(52) U.S. Cl.
CPC ........ *H04L 63/123* (2013.01); *H04L 63/1483* (2013.01); *H04W 12/12* (2013.01); *H04W 12/128* (2021.01)

(58) Field of Classification Search
CPC ..... H04L 63/1441; H04L 51/12; G06F 21/51; G06F 21/56
See application file for complete search history.

(56) References Cited

U.S. PATENT DOCUMENTS 7,908,658 B1 * 3/2011 Oeij .................... H04L 63/1425
                                                    709/206
8,789,177 B1 * 7/2014 Johnston ................. H04L 67/02
                                                    726/10
(Continued)

FOREIGN PATENT DOCUMENTS

CN       103150341 A      6/2013
KR   10-2007-0006559 A    1/2007
(Continued)

OTHER PUBLICATIONS

Lync Server 2013, "Configuring file transfer and URL filtering for isntant messaging (IM) in Lync Server 2013", Nov. 1, 2012, 4 pages, https://technet.microsoft.com.en-us/library/gg520952(d=printer,v=ocs.15).aspx (included in applicant's IDS).*

(Continued)

*Primary Examiner* — Jason K Gee

(57) ABSTRACT

A method and apparatus for analyzing a URL included in contents and displaying the analyzed result is provided. The method includes detecting a URL from contents, analyzing the URL, and displaying the analyzed result.

20 Claims, 15 Drawing Sheets

(51) Int. Cl.
*H04W 12/128* (2021.01)
*H04W 12/12* (2021.01)

(56) References Cited

U.S. PATENT DOCUMENTS

| | | | |
|---|---|---|---|
| 9,202,049 B1* | 12/2015 | Book | ............... G06F 21/56 |
| 2004/0260939 A1 | 12/2004 | Ichikawa et al. | |
| 2005/0050222 A1 | 3/2005 | Packer | |
| 2006/0101514 A1* | 5/2006 | Milener | ............... G06F 21/51 |
| | | | 726/22 |
| 2006/0253581 A1 | 11/2006 | Dixon et al. | |
| 2006/0253584 A1 | 11/2006 | Dixon et al. | |
| 2008/0178096 A1 | 7/2008 | Kusuda | |
| 2009/0300012 A1 | 12/2009 | Levow et al. | |
| 2010/0332593 A1 | 12/2010 | Barash et al. | |
| 2011/0145435 A1 | 6/2011 | Bhatawdekar et al. | |
| 2011/0191849 A1 | 8/2011 | Jayaraman et al. | |
| 2011/0218958 A1 | 9/2011 | Warshavsky et al. | |
| 2011/0314546 A1 | 12/2011 | Aziz et al. | |
| 2012/0047577 A1 | 2/2012 | Costinsky | |
| 2012/0304292 A1* | 11/2012 | Liu | ............... H04L 61/30 |
| | | | 726/22 |
| 2012/0324568 A1* | 12/2012 | Wyatt | ............... G06F 21/51 |
| | | | 726/13 |
| 2013/0055401 A1 | 2/2013 | Kim et al. | |
| 2013/0122861 A1 | 5/2013 | Kim et al. | |
| 2014/0137250 A1 | 5/2014 | Lee et al. | |
| 2015/0011186 A1 | 1/2015 | Yoon et al. | |

FOREIGN PATENT DOCUMENTS

| | | | |
|---|---|---|---|
| KR | 10-2007-0045900 A | 5/2007 | |
| KR | 10-0991100 B1 | 10/2010 | |
| KR | 20140125691 A | 10/2014 | |

OTHER PUBLICATIONS

Spurlock, Bryan, "What's New in Lync Server 2013", Apr. 17, 2013, 8 pages. htt;//windowsitpro.com/lync/whats-new-lync-server-2013.*

Spurlock, Bryan, "What's New in Lync Server 2013", Apr. 17, 2013, 8 pages, (cited previously in prior action and also parent application).*

Lync Server 2013, "Configuring file transfer and URL filtering for Instant Messaging (IM) in Lync Server 2013," Nov. 1, 2012, 4 pages, (included in applicant's IDS and cited in prior application and also parent application).*

Spurlock, Bryan, "What's New in Lync Server 2013," Apr. 17, 2013, 8 pages. (Cited previously in prior action adn also parent application).*

Lafferty, "Facebook tests link preview in desktop chat boxes", Adweek, Aug. 7, 2013, 2 pages. http://www.adweek.com/digital/facebook-tests-link-preview-in-desktop-chat-boxes/?red=if.

Lync Server 2013, "Configuring file transfer and URL filtering for instant messaging (IM) in Lync Server 2013", Nov. 1, 2012, 4 pages. https://technet.microsoft.com.en-us/library/gg520952(d=printer,v=ocs.15).aspx.

Spurlock, Byran, "What's New in Lync Server 2013", Apr. 17, 2013, 8 pages, http://windowsitpro.com/lync/whats-new-lync-server-2013.

"Firefox and IE addon support_WOT (Web of Trust)", Oct. 13, 2011, obtained online <http://web.archive.org/web/2011101319154/http://www.mywot.com/en/support/tour>, obtained on Oct. 24, 2016.

Korean Intellectual Property Office, "Notice of Preliminary Rejection," Application No. KR 10-2013-0109099, dated Oct. 17, 2019, 16 pages.

Notice of Patent Grant in connection with Korean Application No. KR 10-2013-0109099 dated Apr. 28, 2020, 5 pages.

\* cited by examiner

METHOD FOR URL ANALYSIS AND ELECTRONIC DEVICE THEREOF

CROSS-REFERENCE TO RELATED APPLICATIONS

The present application is a continuation of U.S. patent application Ser. No. 14/484,216 filed on Sep. 11, 2014, which is based on and claims priority under 35 U.S.C. § 119 to Korean Patent Application No. 10-2013-0109099 filed on Sep. 11, 2013 in the Korean Intellectual Property Office, the disclosures of which are herein incorporated by reference in their entirety.

BACKGROUND

1. Field

The present disclosure relates to a method for analyzing a uniform resource locator (URL) and an electronic device thereof.

2. Description of Related Art

As information and communication technologies and semiconductor technologies have been developed, various electronic devices have been developed into multimedia devices, each of them for providing various multimedia services. For example, each of the electronic devices may provide the various multimedia services such as a broadcasting service, a wireless Internet service, a camera service, or a music play service.

When selection of a URL included in contents (e.g., documents, messages (short message service (SMS) message, multimedia message service (MMS) message, and long message service (LMS) messages), messengers, and mails) by a user of the electronic device is sensed, the electronic device executes an Internet program, connects to a corresponding URL, and provides a corresponding service.

As described above, when a URL is included in contents, there is an inconvenience in that the electronic device may not acquire information about the corresponding URL before directly connecting to the corresponding URL.

SUMMARY

To address the above-discussed deficiencies, it is a primary object to provide an apparatus and method for detecting a URL from contents, analyzing the URL, and displaying the analyzed result in an electronic device.

Another aspect of the present disclosure is to provide an apparatus and method for verifying whether at least one of "http://", "https://", "ftp://", "irc://", "gopher://", "telnet://," "nntp://", and "worldwind://" is included in a URL to detect the URL from contents in an electronic device.

Another aspect of the present disclosure is to provide an apparatus and method for verifying whether a URL is harmful using a harmful site database stored in a memory or a server in an electronic device.

Another aspect of the present disclosure is to provide an apparatus and method for verifying whether a URL is redirected using an ACKnowledge (ACK) message to a URL connection request in an electronic device.

Another aspect of the present disclosure is to provide an apparatus and method for analyzing a redirected final URL in an electronic device.

Another aspect of the present disclosure is to provide an apparatus and method for verifying whether a file download is linked to a URL in an electronic device.

Another aspect of the present disclosure is to provide an apparatus and method for temporarily downloading a file and verifying at least one of a name, a type, a capacity, a made date, and a corrected date of the file in an electronic device.

Another aspect of the present disclosure is to provide an apparatus and method for verifying whether a file is an installable file in an electronic device.

Another aspect of the present disclosure is to provide an apparatus and method for verifying an authority requested when installing a file in an electronic device.

Another aspect of the present disclosure is to provide an apparatus and method for temporarily installing a file and verifying an authority requested when installing the file in an electronic device.

In accordance with an aspect of the present disclosure, a method of controlling a URL in an electronic device is provided. The method includes detecting a URL from contents, analyzing the URL, and displaying the analyzed result.

In accordance with another aspect of the present disclosure, an electronic device is provided. The electronic device includes at least one processor, at least one display, at least one memory, and at least one program which is stored in at least the one memory and is configured to be executable by at least the one processor, wherein the at least one processor is configured to detect a URL from contents, analyze the URL, and display the analyzed result.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

FIGS. 1 through 9F, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device. Exemplary embodiments of the present disclosure will be described herein below with reference to the accompanying drawings. In the following description, well-known functions or constructions are not described in detail since they would obscure the disclosure in unnecessary detail.

An electronic device according to various embodiments of the present disclosure may be one or a combination of one or more of various devices which include a smart phone, a tablet personal computer (PC), a mobile phone, a video phone, an e-book reader, a desktop PC, a laptop PC, a netbook computer, a personal digital assistant (PDA), a portable multimedia player (PMP), a moving picture experts group (MPEG) layer 3 (MP3) player, a mobile medical device, an electronic bracelet, an electronic necklace, electronic accessories, a camera, a wearable device, an electronic watch, a wristwatch, smart home appliances (e.g., a refrigerator, an air conditioner, a cleaner, a cybot, a television (TV), a digital versatile disc (DVD) player, an audio, an oven, a microwave oven, a washing machine, an air cleaner, and an electronic picture frame), various medical devices (e.g., a magnetic resonance artery (MRA), a magnetic resonance imaging (MM), a ct (Computed Tomography), an imaging apparatus, and a ultrasonic machine), a navigation device, a global positioning system (GPS) receiver, an event data recorder (EDR), a flight data recorder (FDR), a set-top box, a TV box (e.g., SAMSUNG HOMESYNC, APPLE TV, or GOOGLE TV), an electronic dictionary, a car infotainment device, electronic equipment for a ship (e.g., a navigation device for ship and a gyrocompass), an air electronic device, a security device, electronic clothes, an electronic key, a camcorder, a game console, a head mounted display (HMD), a flat panel display, an electronic album, a part of furniture or a building/structure including a communication function, an electronic board, an electronic signature input device, a projector, or any other suitable device. It is obvious to a person skilled in the art that the electronic device according to various embodiments of the present disclosure is not limited to the above-described devices.

Figure 1:
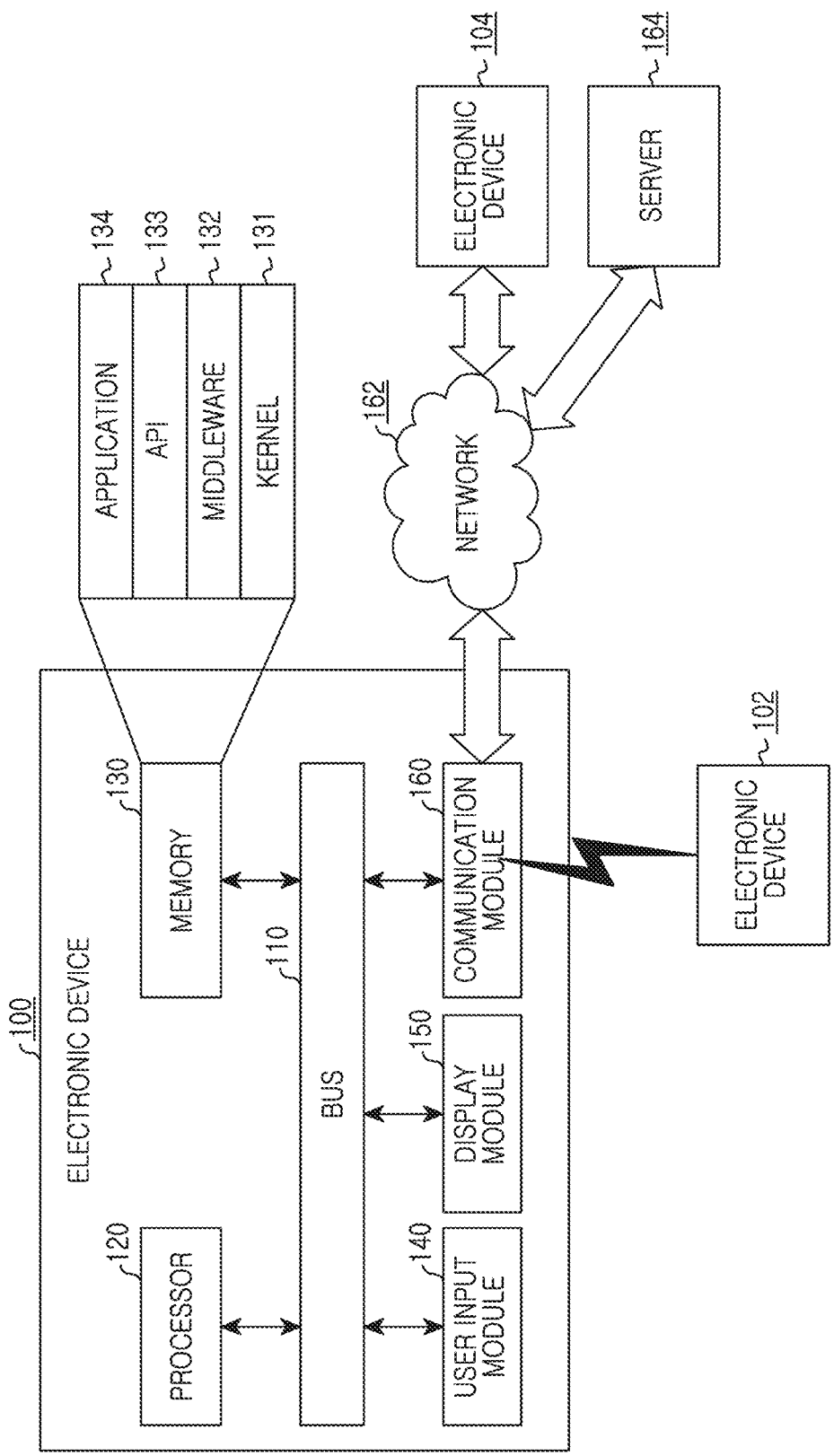
FIG. 1 is a block diagram illustrating a configuration of an electronic device according to embodiments of the present disclosure.

FIG. 1 is a block diagram illustrating configuration of an electronic device according to one embodiment of the present disclosure.

Referring to FIG. 1, the electronic device denoted by 100 includes a bus 110, a processor 120, a memory 130, a user input module 140, a display module 150, and a communication module 160.

The bus 110 may be a circuit which may connect components (e.g., the processor 120, the memory 130, the user input module 140, the display module 150, or the communication module 160) included in the electronic device 100 with each other and transmit communication (e.g., a control message) between the components.

The processor 120 may receive commands from the components included in the electronic device 100 through the bus 110, decode the received commands, and perform calculations or data processing according to the decoded commands.

The memory 130 stores commands or data which are received from the processor 120 or other components (e.g., the user input module 140, the display module 150, and the communication module 160) or are generated by the processor 120 or other components. For one example, the memory 130 may store harmful site information (URL or Internet Protocol (IP)). For another example, the memory 130 may store URL detection information (e.g., "http://", "https://", "ftp://", "irc://", "gopher://", "telnet://," "nntp://", and "worldwind://") for detecting a URL included in contents. For another example, the memory 130 may store extension information (e.g., *.apk, *.jpg, and *.mp3) for detecting whether a file download is linked to a URL.

Also, the memory 130 may include at least one programming module including a kernel 131, a middleware 132, an Application Programming Interface (API) 133, or an application 134. Herein, at least the one programming module may be software, firmware, hardware, or a combination of two or more of these.

The kernel 131 may control or manage system resources (e.g., the bus 110, the processor 120, or the memory 130) used to execute an operation or function implemented in the other programming modules (e.g., the middleware 132, the API 133, or the application 134). Also, the kernel 131 may provide an interface which may access a separate component of the electronic device 100 in the middleware 132, the API 133, or the application 134 and control or manage the separate component.

The middleware 132 may play a role as a go-between such that the API 133 or the application 134 communicates with the kernel 131 and transmits and receives data. Also, the middleware 132 may perform load balancing for work requests using a method of assigning priority which may use a system resource (e.g., the bus 110, the processor 120, or the memory 130) of the electronic device 100 to the work requests received from at least the one application 134.

The API 133 is an interface in which the application 134 may control a function provided from the kernel 131 or the middleware 132. The API 133 may include at least one interface or function for file control, window control, image processing, or text control.

The user input module 140 may receive commands or data from the user and transmit the received commands or data to the processor 120 or the memory 130 through the bus 110.

The display module 150 displays videos, images, or data to the user.

The communication module 160 may perform communication between the electronic device 100 and other electronic devices 102 and 104. Herein, the communication module 160 may support a local-area communication protocol (e.g., Wireless-Fidelity (Wi-Fi), BlueTooth (BT), Near Field Communication (NFC), or network communication (e.g., the Internet, a Local Area Network (LAN), a Wide Area Network (WAN), a telecommunication network, a cellular network, a satellite network, or a Plain Old Telephone Service (POTS)).

Each of the other electronic devices 102 and 104 may be the same device (e.g., the same type) as the electronic device 100 or a device which is different (e.g., a different type) from the electronic device 100.

Figure 2:
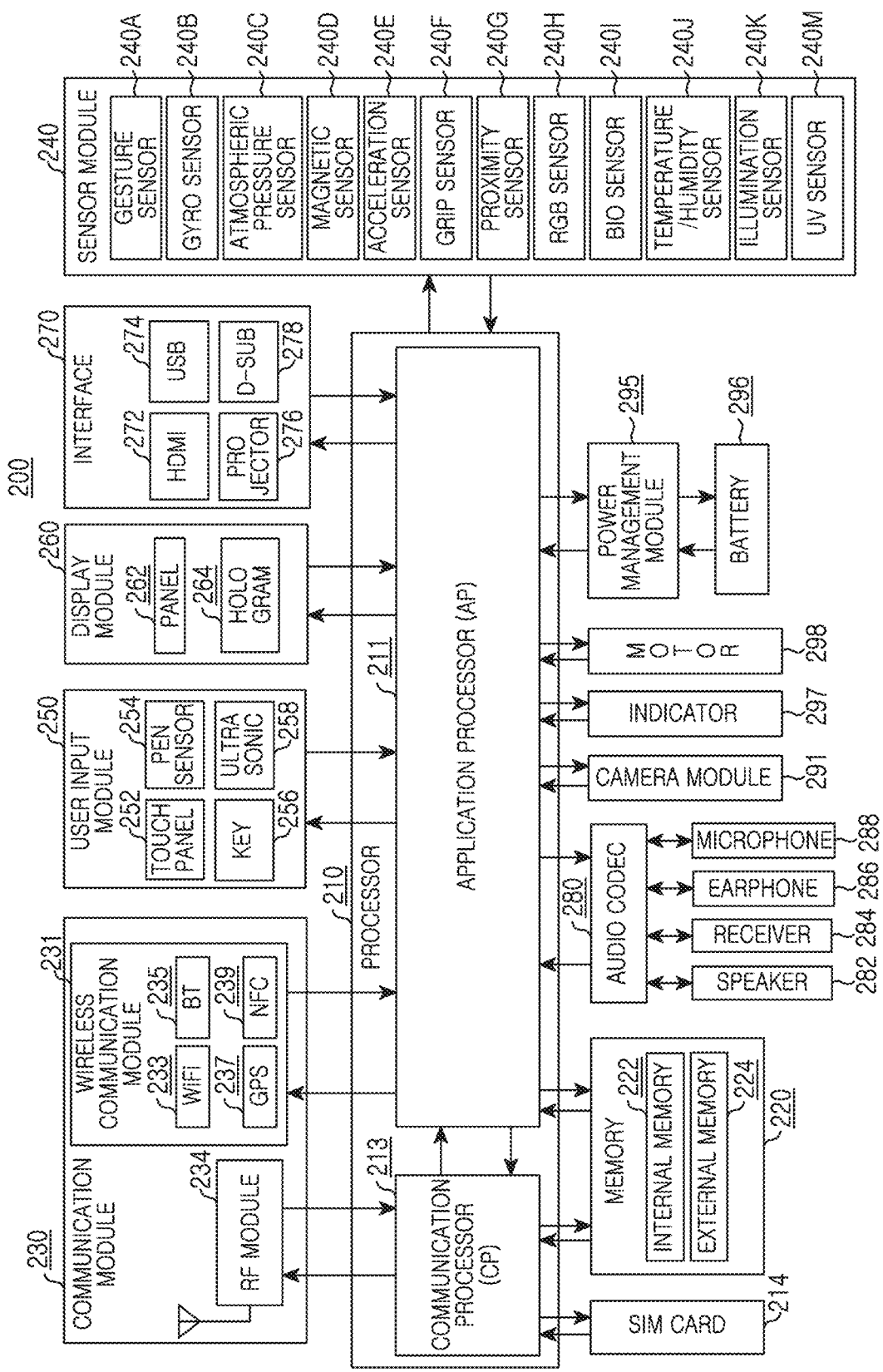
FIG. 2 is a block diagram illustrating a detailed configuration of hardware according to embodiments of the present disclosure.

FIG. 2 is a block diagram illustrating a detailed configuration of hardware according to embodiments of the present disclosure.

Referring to FIGS. 1 and 2, the hardware denoted by 200 may include one or more processors 210, a Subscriber Identity Module (SIM) card 214, a memory 220, a communication module 230, a sensor module 240, a user input module 250, a display module 260, an interface 270, an audio codec 280, a camera module 291, a power management module 295, a battery 296, an indicator 297, and a motor 298. Herein, the hardware 200 may be the electronic device 100 shown in FIG. 1.

The processor 210 may include one or more Application Processors (APs) 211 and one or more Communication Processors (CPs) 213. Herein, the processor 210 may be the processor 120 shown in FIG. 1.

The AP 211 and the CP 213 shown in FIG. 2 are shown to be included in the processor 210. However, the AP 211 and the CP 213 may be included in different IC packages, respectively. Also, the AP 211 and the CP 213 may be included in one IC package. In addition, the processor 210 may further include a Graphic Processing Unit (GPU).

The AP 211 may execute an Operating System (OS) or an application program, control a plurality of hardware or software components connected thereto, and process and calculate various data including multimedia data. Herein, the AP 211 may be implemented as System on Chip (SoC).

The CP 213 may perform a function for managing a data link in communication between other electronic devices connected with an electronic device including the hardware 200 through a network and change a communication protocol. Herein, the CP 213 may be implemented as SoC.

Also, the CP 213 may perform at least a part of a multimedia control function.

Also, the CP 213 may identify and authenticate a terminal in a communication network using an SIM (e.g., the SIM card 214). Herein, the CP 213 may provide a service including a voice call, a video call, a text message, or packet data to a user of the hardware 200.

The CP 213 may control data transmission and reception of the communication module 230.

In FIG. 2, components of the CP 213, the power management module 295, or the memory 220 are shown as components which are separated from the AP 211. However, the AP 211 may be implemented to include a part (e.g., the CP 213) of the components.

The AP 211 or the CP 213 may load and process commands or data received from at least one of a non-volatile memory or another component connected thereto to a volatile memory. Also, the AP 211 or the CP 213 may store data which are received from at least one of other components or are generated by at least one of other components in a non-volatile memory.

The SIM card 214 may be a card implementing a SIM. The SIM card 214 may be inserted into a slot formed in a specific position of the electronic device. The SIM card 214 may include unique identification information (e.g., an integrated circuit card identity (ICCID)) or subscriber information (e.g., an international mobile subscriber identity (IMSI)).

The memory 220 may include an internal memory 222 or an external memory 224. Herein, the memory 220 may be the memory 130 shown in FIG. 1.

The internal memory 222 may include at least one of a volatile memory (e.g., a dynamic random access memory (DRAM), a static RAM (SRAM), or a synchronous dynamic RAM (SDRAM)) or a non-volatile memory (e.g., a onetime programmable read only memory (OTPROM), a PROM, an erasable PROM (EPROM), an electrically erasable PROM (EEPROM), a mask ROM, a flash ROM, a NAND flash memory, or a NOR flash memory). Herein, the internal memory 222 may include a type of a solid state disk (SSD).

The external memory 224 may include at least one of a compact flash (CF) card, a secure digital (SD) card, a micro-SD card, a mini-SD card, an extreme digital (xD) card, or a memory stick.

The communication module 230 may include a wireless communication module 231 or a radio frequency (RF) module 234. Herein, the communication module 230 may be the communication module 160 shown in FIG. 1.

The wireless communication module 231 may provide a wireless communication function using RFs. For one example, the wireless communication module 231 may include a Wi-Fi module 233, a BT module 235, a GPS module 237, or a NFC module 239. For another example, the wireless communication module 231 may include a network interface (e.g., a LAN card) or a modem for connecting the hardware 200 with the network (e.g., the Internet, a LAN, a WAN, a telecommunication network, a cellular network, a satellite network, or a POTS).

The RF module 234 may control transmission and reception of data including an RF signal or a called electronic signal. For example, the RF module 234 may include a transceiver, a power amplifier module (PAM), a frequency filter, or a low noise amplifier (LNA). Also, the RF module 234 may include components (e.g., conductors or conducting wires) for transmitting and receiving electromagnetic waves on a free space in wireless communication.

The sensor module 240 may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a red, green, and blue (RGB) sensor 240H, a biosensor 240I, a temperature/humidity sensor 240I, an illumination sensor 240K, and a ultra violet (UV) sensor 240M. Also, the sensor module 240 may measure a physical quantity or sense an operation state of the electronic device, and convert the measured or sensed information into an electric signal. For example, the sensor module 240 may include an olfactory sensor, an electromyography (EMG)

sensor, an electroencephalogram (EEG) sensor, an electrocardiogram (ECG) sensor, or a fingerprint sensor. Also, the sensor module 240 may further include a control circuit for controlling one or more sensors included therein.

The user input module 250 may include a touch panel 252, a pen sensor 254, a key 256, or an ultrasonic input device 258. Herein, the user input module 250 may be the user input module 140 shown in FIG. 1.

The touch panel 252 may recognize a touch input by at least one of a capacitive type, a resistive type, an infrared type, or an ultrasonic type. Herein, the touch panel 252 may further include a controller. In case of the capacity type, the touch panel 252 may recognize not only direct touch input but also proximity touch input. The touch panel 252 may further include a tactile layer. Herein, the touch panel 252 may provide a tactile response to the user.

The pen sensor 254 may be implemented using the same or similar method as a method of receiving a touch input of the user or using a separate sheet for recognition.

The key 256 may include a keypad or a touch key.

The ultrasonic input device 258 is a device which may sense sound waves using a microphone 288 and verify data in the electronic device through a pen which generates ultrasonic waves. The ultrasonic input device 258 may perform wireless recognition.

The hardware 200 may receive input of the user from an external device (e.g., the network 102 of FIG. 1, a computer, or the server 164 of FIG. 1) connected with the communication module 230 using the communication module 230.

The display module 260 may include a panel 262 or a hologram 264. Herein, the display module 260 may be the display module 150 shown in FIG. 1.

The panel 262 may be a liquid crystal display (LCD) or an active matrix-organic light-emitting Diode (AM-OLED). Also, the panel 262 may be flexibly, transparently, or wearably implemented. Herein, the panel 262 and the touch panel 252 may be integrated with each other to constitute one module.

The hologram 264 shows stereoscopic images on the air using interference of light.

In addition, the display module 260 may further include a control circuit for controlling the panel 262 or the hologram 264.

The interface 270 may include a high definition multimedia interface (HDMI) 272, a universal serial bus (USB) interface 274, a projector 276, a D-sub (subminiature) interface 278, a secure digital/multimedia Card (SD/MMC) interface, or an infrared data association (IrDA) interface.

The audio codec 280 may convert voices and electronic signals in a two-way direction. For example, the audio codec 280 may convert voice information input or output through a speaker 282, a receiver 284, an earphone 286, or the microphone 288.

The camera module 291 may capture images and videos. For example, the camera module 291 may include one or more image sensors (e.g., a front lens or a rear lens), an image signal processor (ISP), or a flash LED.

The power management module 295 may manage power of the hardware 200. For example, the power management module 295 may include a power management integrated circuit (PMIC), a charging IC, or a battery gauge. The PMIC may be mounted in an IC or a SoC semiconductor.

A charging method of the power management module 295 may be classified into a wire charging method or a wireless charging method.

The charging IC may charge a battery and prevent inflow of overvoltage or overcurrent from a charger. Herein, the charging IC may include a charging IC for at least one of the wire charging method or the wireless charging method. The wireless charging method is a magnetic resonance method, a magnetic induction method, or an electromagnetic wave method. In the wireless charging method, additional circuits (e.g., a coil loop, a resonance circuit, and a rectifier circuit) for wireless charging may be added.

The battery gauge may measure the remaining capacity of the battery 296, voltage in charging, current, or a temperature.

The battery 296 may generate electricity and supply power. For example, the battery 296 may be a rechargeable battery.

The indicator 297 may indicate a specific state (e.g., a booting state, a message state, or a charging state) of the hardware 200 or a part of the hardware (e.g., the AP 211).

The motor 298 may convert an electric signal into a mechanical vibration.

A micro control unit (MCU) may control the sensor module 240.

In addition, the hardware 200 may further include a processing device (e.g., a GPU) for supporting a mobile TV. For example, the processing device for supporting a mobile TV may process media data according to the standard of digital multimedia broadcasting (DMB), digital video broadcasting (DVB), or media flow.

Names of components of hardware according to one embodiment of the present disclosure may differ according to kinds of electronic devices. The hardware according to one embodiment of the present disclosure may include at least one of the components. Some components of the hardware may be omitted or the hardware may further include other additional components. Also, some of the components of the hardware according to one embodiment of the present disclosure are combined and configured as one device. Therefore, the one device may equally perform functions of the corresponding components before some of the components are combined.

Figure 3A:
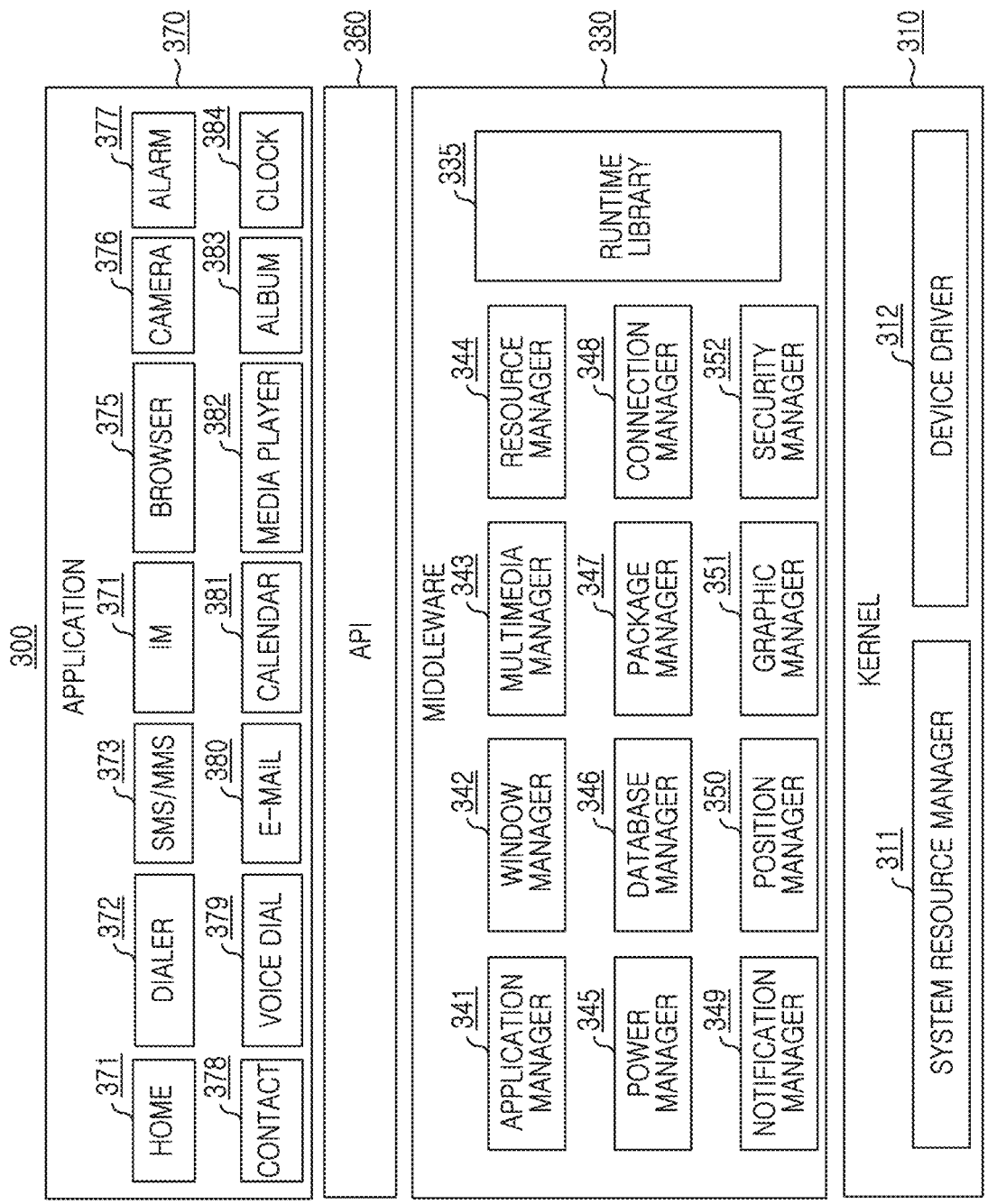
FIG. 3A is a block diagram illustrating a detailed configuration of a programming module according to embodiments of the present disclosure.

FIG. 3A is a block diagram illustrating a detailed configuration of a programming module according to embodiments of the present disclosure.

Referring to FIGS. 1, 2, and 3A, the programming module denoted by 300 may include a kernel 310, middleware 330, an API 360, or an application 370. The programming module 300 may be included (e.g., stored) in the electronic device 100 (e.g., the memory 130) shown in FIG. 1. At least a part of the programming module 300 may be configured by software, firmware, hardware, or combination of two or more of them. The programming module 300 may include an OS which is implemented in the hardware 200 of FIG. 2 and controls resources related to the electronic device 100, or may include the plurality of applications 370 executed in the OS. For example, the OS may include Android, iOS, Windows, Symbian, Tizen, or Bada.

The kernel 310 may include a system resource manager 311 or a device driver 312. Herein, the kernel 310 may be the kernel 131 shown in FIG. 1.

The system resource manager 311 may control, assign, or collect system resources. For example, the system resource manager 311 may include a process management unit, a memory management unit, or a file system management unit.

The device driver 312 may include a display driver, a camera driver, a Bluetooth driver, a shared memory driver, a USB driver, a keypad driver, a Wi-Fi driver, an audio driver, or an inter process communication (IPC) driver.

The middleware 330 may include a plurality of modules which are previously implemented to provide functions the application 370 uses in common. Herein, the middleware 330 may be the middleware 132 shown in FIG. 1. Also, the middleware 330 may provide functions through the API 360 such that the application 370 uses limited system resources in the electronic device efficiently. For example, the middleware 330 may include at least one of a runtime library 335, an application manager 341, a window manager 342, a multimedia manager 343, a resource manager 344, a power manager 345, a database manager 346, a package manager 347, a connection manager 348, a notification manager 349, a position manager 350, a graphic manager 351, and a security manager 352.

The runtime manager 355 may include a library module used by a compiler to add a new function through a programming language while the application 370 is executed. For example, the runtime manager 355 may perform a function for input and output, memory management, or an arithmetic function.

The application manager 341 may manage a life cycle of at least one of the applications 370.

The window manager 342 may manage graphic user interface (GUI) resources used on a screen of the electronic device.

The multimedia manager 343 may ascertain a format necessary for reproducing various media files and encode or decode a media file using a codec corresponding to the corresponding format.

The resource manager 344 may manage source codes of at least one of the applications 370, and manage resources of the memory 130 shown in FIG. 1 or resources of a storage.

The power manager 345 may act with a basic input output system (BIOS), manage a battery or a power source, and provide power information necessary for an operation.

The database manager 346 may perform a management operation to generate, search, or change a database to be used in at least one of the applications 370. For example, the database manager 346 may manage harmful site information (e.g., a URL or an IP) stored in the memory 130 shown in FIG. 1.

The package manager 347 may manage installation or update of an application distributed by a type of a package file. For example, when an installable file is downloaded through a URL, the package manager 347 may install the corresponding file temporarily in a temporary installation region before being actually installed.

The connection manager 348 may manage wireless connection of Wi-Fi or BT.

The notification manager 349 may display or notify events of an arrival message, an appointment, and a proximity notification by a method which is not disturbed to the user.

The position manager 350 may manage position information of the electronic device.

The graphic manager 350 may manage a graphic effect to be provided to the user or a UI related to the graphic effect.

The security manager 352 may provide all security functions necessary for system security or user authentication.

In addition, when the electronic device 100 shown in FIG. 1 has a phone function, the middleware 330 may further include a call manager for managing a voice or video call function of the electronic device 100.

The middleware 330 may generate and use a new middleware module through various function combinations of internal component modules. The middleware 330 may provide a module which specializes while being classified according to kinds of OSs to provide a differentiated function. Also, the middleware 330 may dynamically delete some old components or add new components. Therefore, some components described in various embodiments of the present disclosure may be omitted, other components may be further added, or components having different names for performing similar functions may be replaced.

The API 360 as a set of API programming functions may be provided as different components according to OSs. Herein, the API 360 may be the API 133 shown in FIG. 1. For example, in case of Android or iOS, one API set may be provided while being classified according to platforms. In case of Tizen, two or more API sets may be provided.

The application 370 may include a preloaded application or a third party application. Herein, the application 370 may be the application 134 shown in FIG. 1.

The programming module 300 may be implemented as instructions stored in a storing medium which is readable by at least a computer. When an instruction may be executed by the one or more processors 210 shown in FIG. 1, the one or more processors 210 may perform a function corresponding to the instructions. The storing medium which is readable by the computer may be the memory 260 shown in FIG. 2. Also, a part of the programming module 300 may be implemented (e.g., executed) by the processor 210. A part of the programming module 300 may include a module for performing one or more functions, a program, a routine, an instruction set, or a process.

Names of the components of the programming module 300 according to one embodiment of the present disclosure may differ according to kinds of OSs. Also, the programming module 300 according to one embodiment of the present disclosure may include one or more components listed above. Some of the components may be omitted. The programming module 300 according to one embodiment of the present disclosure may further include additional components.

Figure 3B:
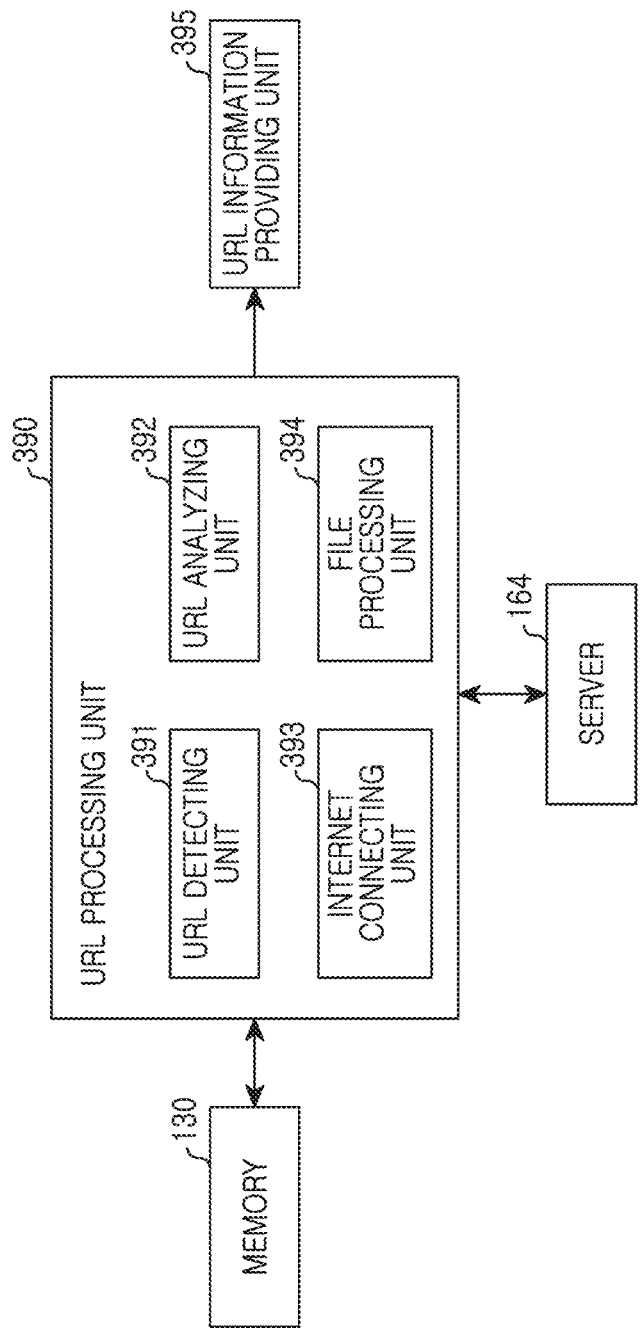
FIG. 3B is a block diagram illustrating a detailed configuration of a URL processing unit and a URL information providing unit according to embodiments of the present disclosure.

FIG. 3B is a block diagram illustrating detailed configuration of a URL processing unit and a URL information providing unit according to embodiments of the present disclosure.

As shown in FIGS. 1, 3A, and 3B, an electronic device may include the URL processing unit denoted by 390 and the URL information providing unit denoted by 395. Herein, the URL processing unit 390 may include a URL detecting unit 391, a URL analyzing unit 392, an Internet connecting unit 393, and a file processing unit 394. Herein, in accordance with one embodiment of the present disclosure, respective functions included in the URL processing unit 390 and the URL information providing unit 395 may be executed in one module. Or, respective functions included in the URL processing unit 390 and the URL information providing unit 395 may be independently executed while being classified according to respective modules. Also, the URL detecting unit 391, the URL analyzing unit 392, the Internet connecting unit 393, and the file processing unit 394 may be included in each of the applications 134 and 370 or each of the middleware 132 and 330.

The URL detecting unit 391 may verify whether a URL is included in received contents. If it is sensed that the URL is included in the received contents, the URL detecting unit 391 may transmit a corresponding URL address to the server 164 through the Internet connecting unit 394. Herein, when user input for the corresponding URL is generated, the URL detecting unit 391 may transmit the URL address to the server 164 through the Internet connecting unit 393.

The URL analyzing unit 392 may verify whether the corresponding URL indicates a harmful site. Also, the URL analyzing unit 392 may verify whether the corresponding URL is redirected. Herein, the URL analyzing unit 392 may further include a URL redirection verifying unit for verifying whether the corresponding URL is redirected. Transmitting the URL through the Internet connecting unit 393, the URL analyzing unit 302 may receive an ACK message for redirection according to the URL. The URL analyzing unit 302 may extract redirection URL information which replies to the transmitted URL from the corresponding ACK message.

The URL information providing unit 395 may provide additional information based on the result of processing the URL in the URL processing unit 390 and the result of analyzing the file in the URL processing unit 390. Herein, the URL information providing unit 395 may perform a control operation to display information of the corresponding URL.

The file analyzing unit 394 may download a file linked to the URL temporarily and analyze the downloaded file. Herein, the file analyzing unit 394 may verify whether the file linked to the URL is an installable file and verify an authority requested when installing the file.

Figure 4:
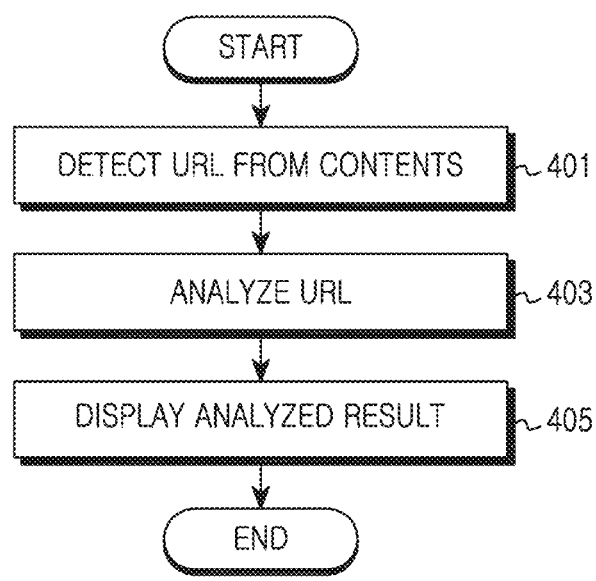
FIG. 4 is a flowchart illustrating a process of analyzing a URL included in contents in an electronic device according to embodiments of the present disclosure.

FIG. 4 is a flowchart illustrating a process of analyzing a URL included in contents in an electronic device according to embodiments of the present disclosure.

Referring to FIG. 4, the electronic device detects a URL from contents in operation 401. For example, the electronic device may verify at least one of "http://", "https://", "ftp://", "irc://", "gopher://", "telnet://", "nntp://", and "worldwind://" is included in the contents. Herein, the contents may include at least one of documents, messages (SMS message, MMS messages, and LMS messages), messengers, and mails.

Thereafter, the electronic device may analyze the URL included in the contents in operation 403. For one example, the electronic device may verify whether the URL is harmful. For another example, the electronic device may verify whether the URL is redirected. For another example, the electronic device whether a file download is linked to the URL. For another example, the electronic device may verify information of a file linked to the URL. For another example, the electronic device may verify whether the file linked to the URL is an installable file. For another example, the electronic device may verify an authority requested when installing the file, when the file linked to the URL is an installable file. For another example, the electronic device may install the installable file linked to the URL temporarily and verify an authority requested when installing the file.

Figure 9A:
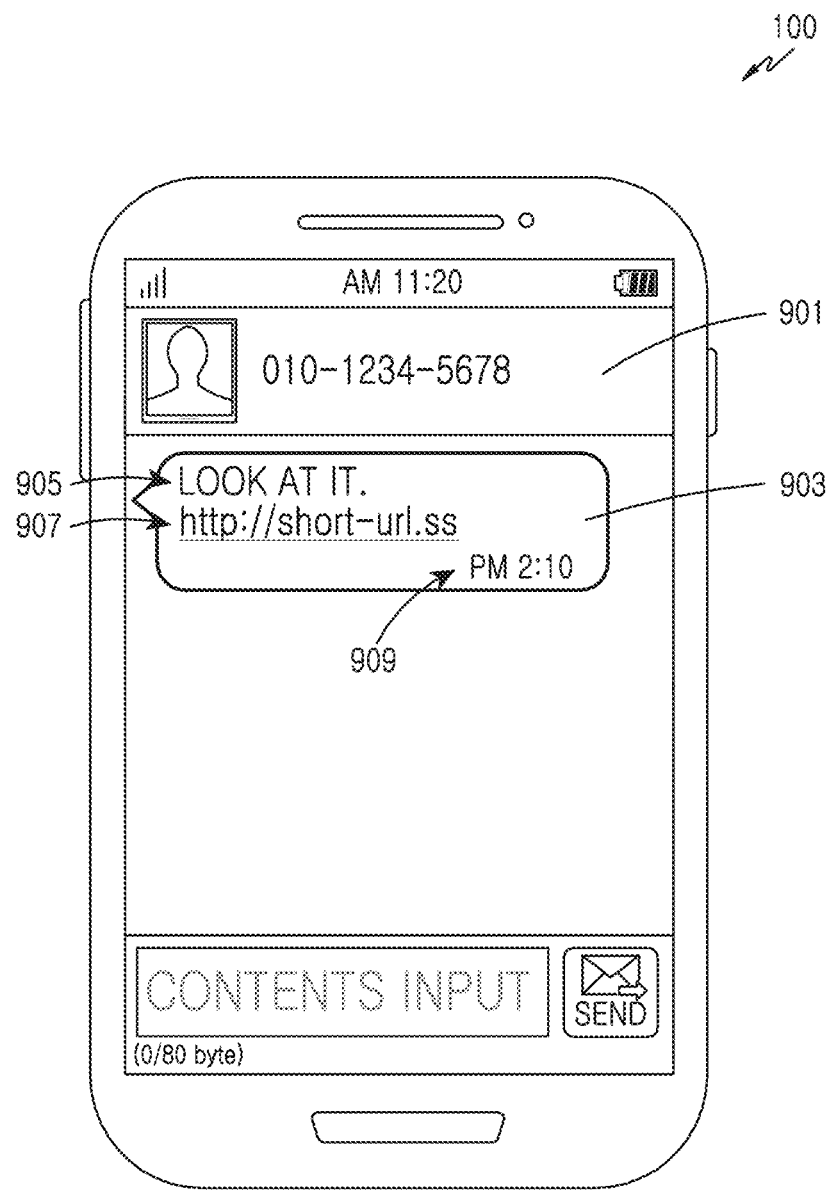
FIGS. 9A, 9B, 9C, 9D, 9E and 9F are screens illustrating a process of displaying an analyzed result of a URL included in a message in an electronic device according to embodiments of the present disclosure.
Figure 9B:
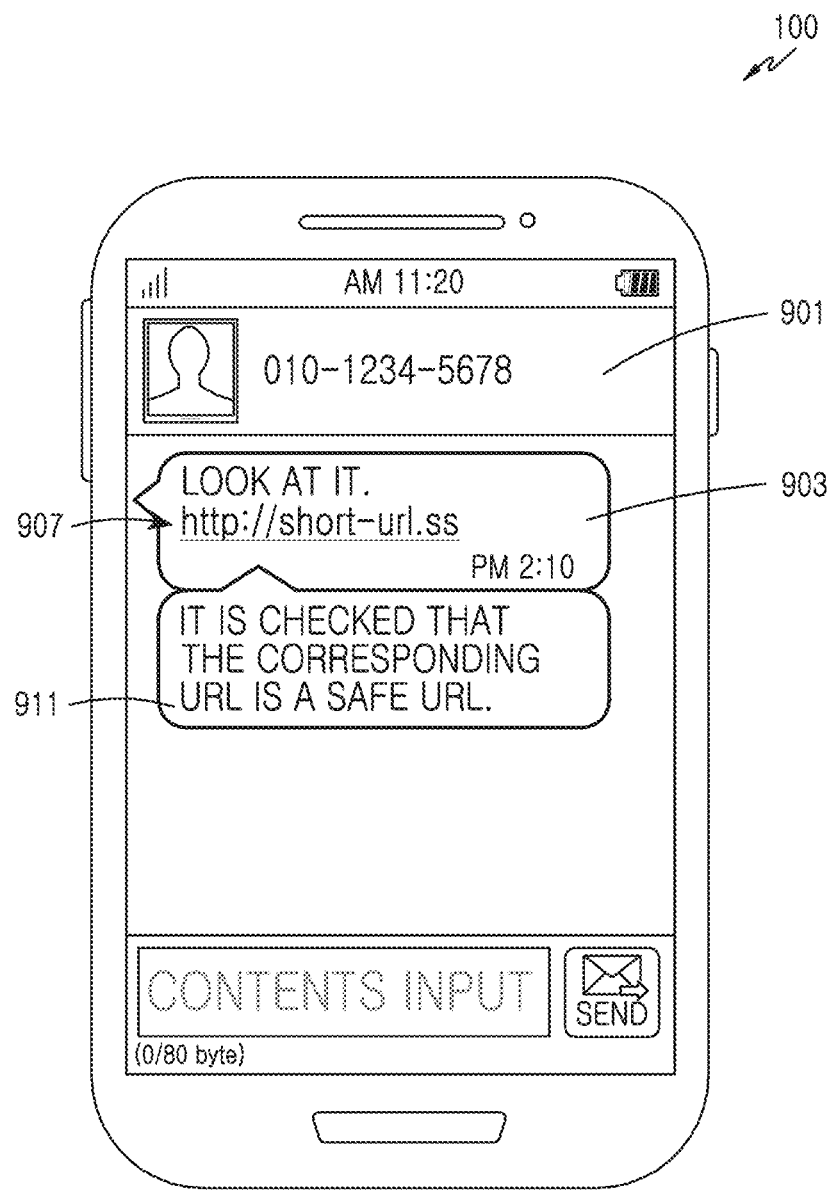
Figure 9C:
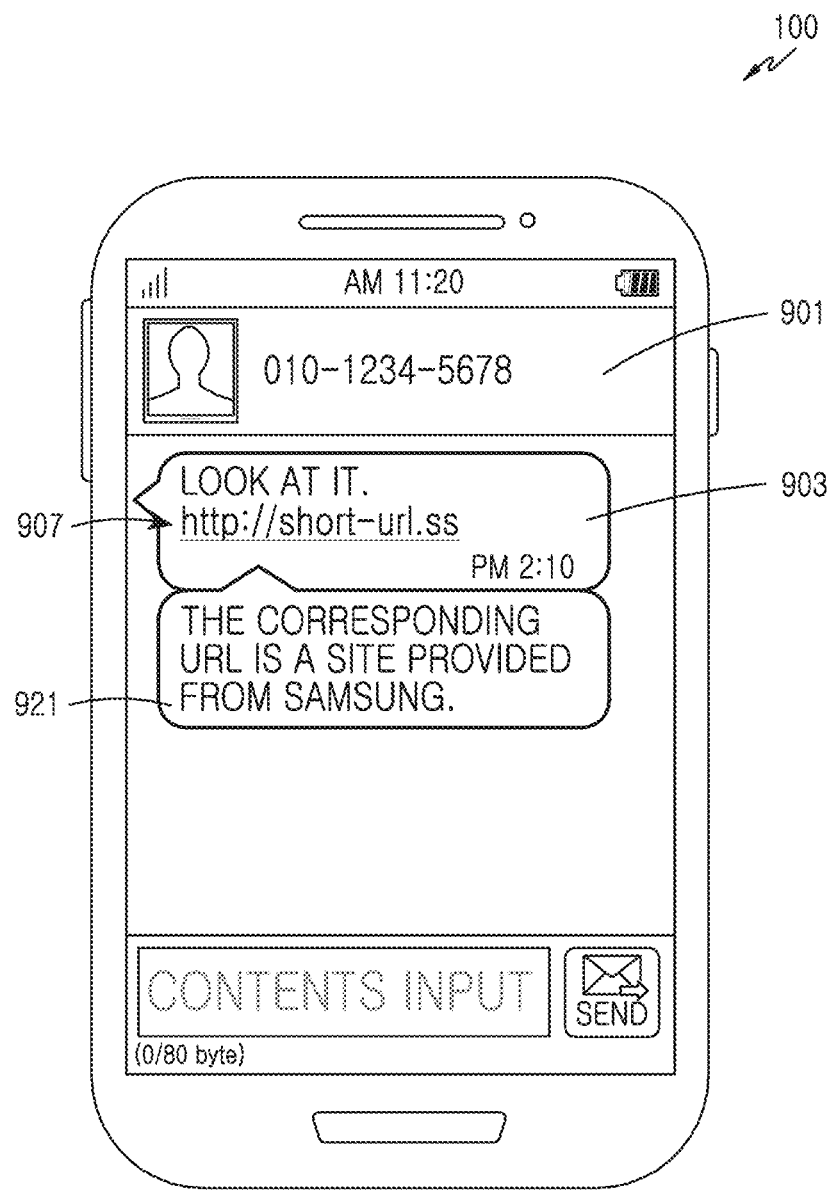
Figure 9D:
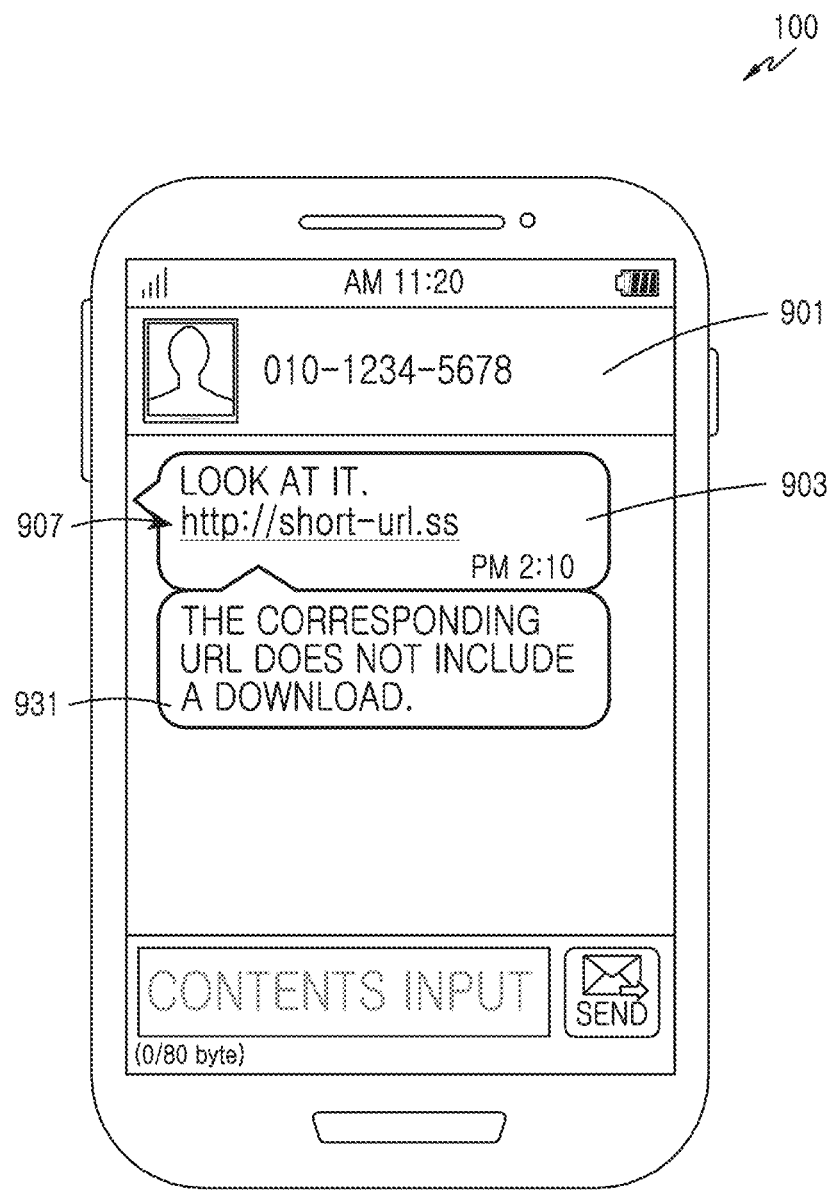
Figure 9E:
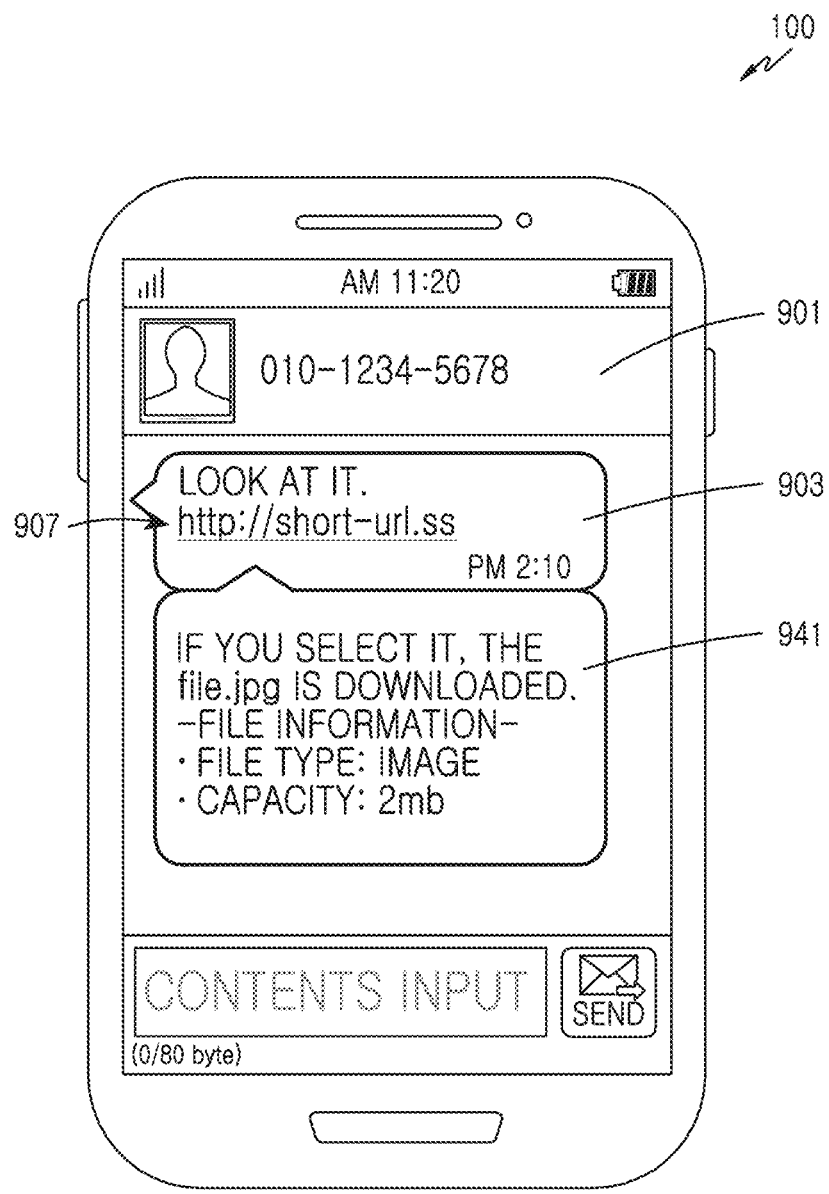
Figure 9F:
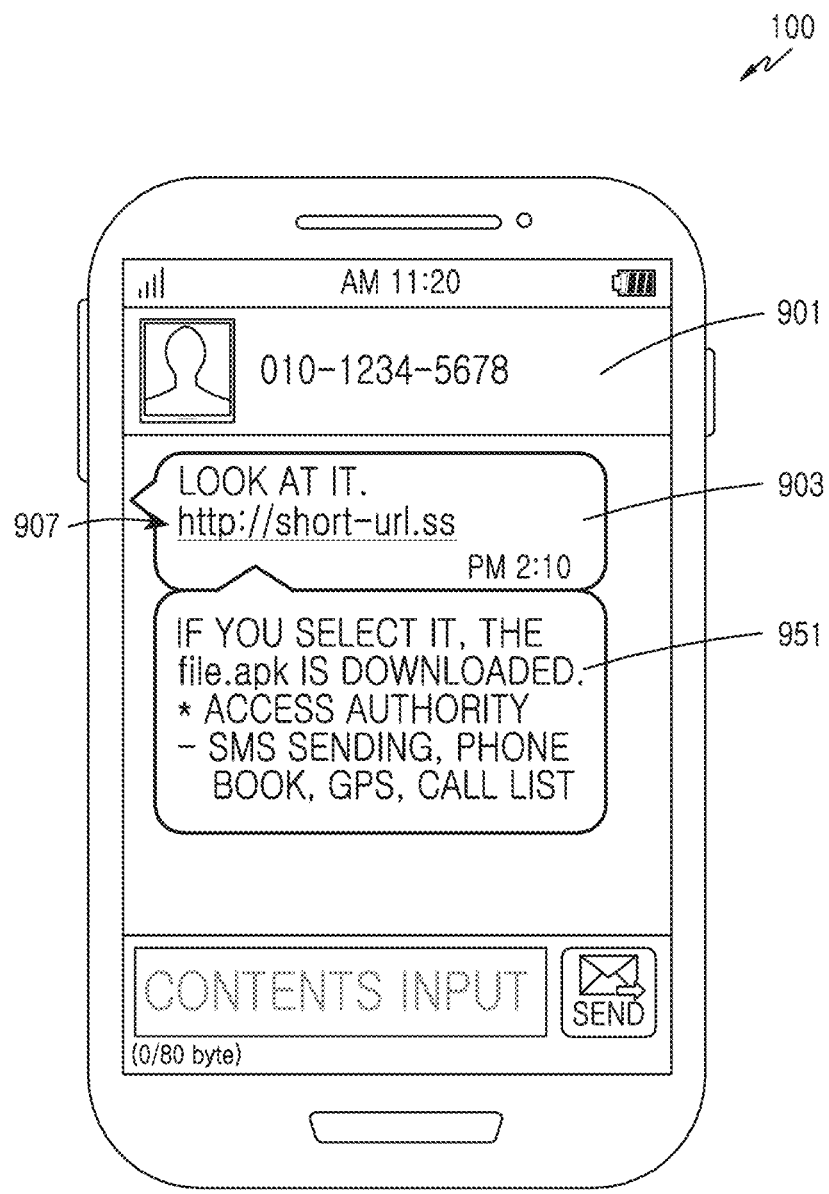

Thereafter, the electronic device displays the result of analyzing the URL in operation 405. For one example, as shown in FIG. 9B, the electronic device may display a message indicating that the URL 907 is not harmful (see reference number 911). For another example, as shown in FIG. 9C, the electronic device may display redirected final URL information of the URL 907 (see reference number 921). For another example, as shown in FIG. 9D, the electronic device may display whether a file download is linked to the URL 907 (see reference number 931). For another example, as shown in FIG. 9E, the electronic device may display information of a file linked to the URL 907 (see reference number 941). For another example, as shown in FIG. 9F, the electronic device may display an authority requested when installing a file, when the file linked to the URL 907 is an installable file (see reference number 951).

Thereafter, the electronic device ends the process of FIG. 4.

In the above-described embodiment of the present disclosure, the electronic device detects the URL from the contents, analyzes the URL, and displays the analyzed result.

Figure 5:
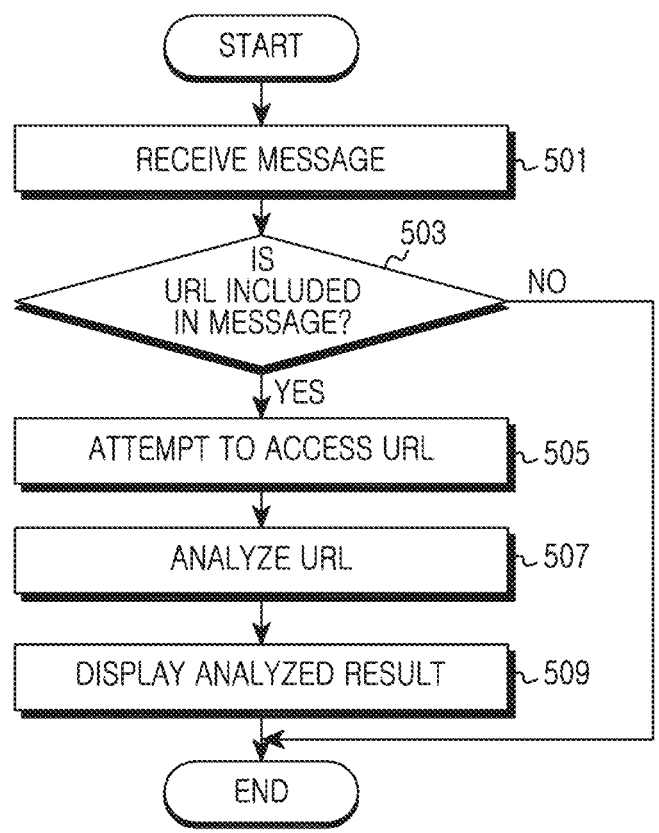
FIG. 5 is a flowchart illustrating a process of analyzing a URL included in a message in an electronic device according to embodiments of the present disclosure.

In another embodiment of the present disclosure, as shown in FIG. 5, a description will be given for a message among contents as an example.

FIG. 5 is a flowchart illustrating a process of analyzing a URL included in a message in an electronic device according to embodiments of the present disclosure.

Referring to FIGS. 1, 3A, and 5, the electronic device receives a message in operation 501. For example, receiving a message through the communication module 160, the electronic device may perform a control operation to execute the SMS/MMS application 373 and display a message 903, as shown in FIG. 9A.

After receiving the message, the electronic device verifies whether a URL is included in the message in operation 503. For example, the electronic device may verify whether at least one of "http://", "https://", "ftp://", "irc://", "gopher://", "telnet://", "nntp://", and "worldwind://" is included in the message. Herein, the electronic device may include a URL detection module for verifying whether a URL is included in the message. If the URL is not included in the message, the electronic device may end the process of FIG. 5.

Alternatively, when the URL is included in the message, the electronic device attempts to access the URL in operation 505. For example, as shown in FIG. 9A, when a URL (http://short-url.ss) 907 is included in the message 903, the electronic device may receive an IP address corresponding to the URL (http://short-url.ss) 907 from a domain name server (DNS) and attempt to access the received IP address. Herein, the electronic device may include an Internet connecting unit for accessing the URL included in the message.

Thereafter, the electronic device analyzes the URL in operation 507. For one example, the electronic device may verify whether the "http://short-url.ss" 907 is included in harmful site information stored in the memory 130. For another example, the electronic device may verify whether an IP address corresponding to the "http://short-url.ss" 907 is included in harmful site information stored in the memory 130. For another example, the electronic device may verify whether the "http://short-url.ss" 907 is included in harmful site information stored in the server 164. For another example, the electronic device may verify whether an IP address corresponding to the "http://short-url.ss" 907 is included in the harmful site information stored in the server 164. Herein, the electronic device may include a URL analyzing unit for analyzing a URL.

Thereafter, the electronic device displays the result of analyzing the URL in operation 509. For example, the electronic device may display, as shown in FIG. 9B, information indicating whether the URL 907 indicates a harmful site (see reference number 911). Herein, the electronic device may include a URL information providing unit for providing a result of analyzing a URL.

Thereafter, the electronic device ends the process of FIG. 5.

Figure 6:
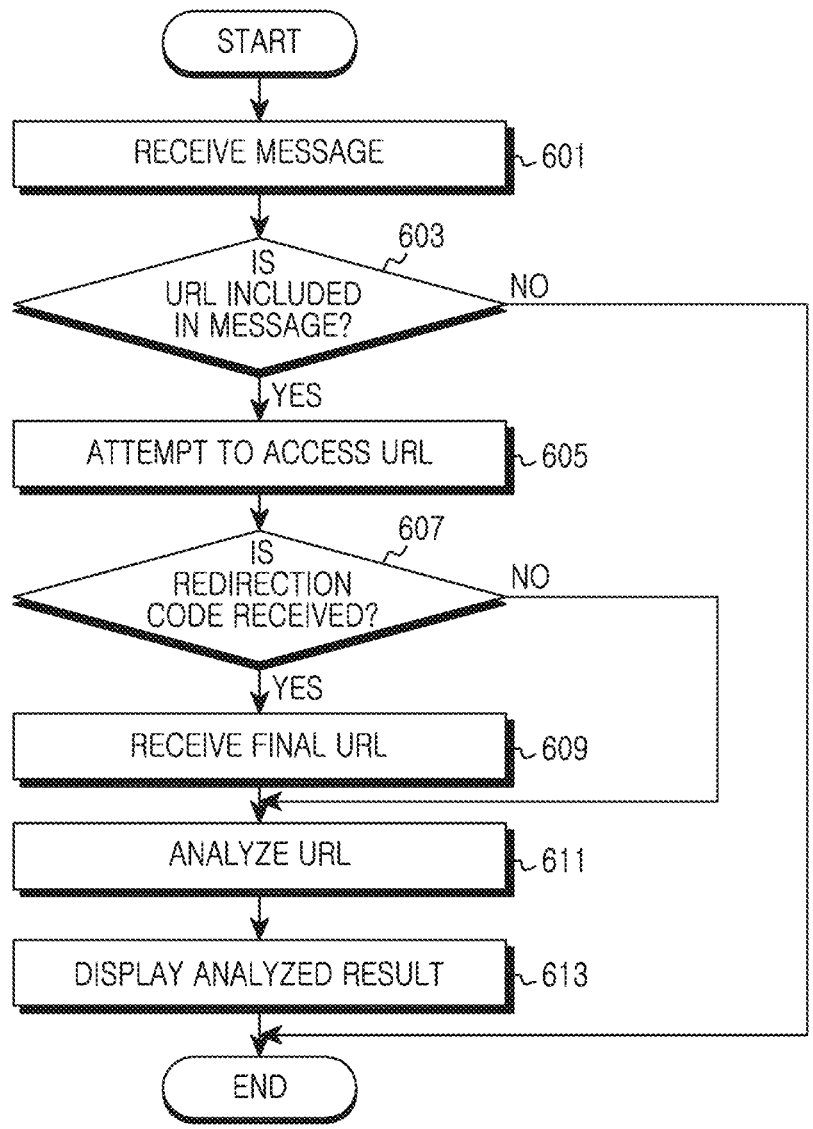
FIG. 6 is a flowchart illustrating a process of analyzing a redirected URL included in a message in an electronic device according to embodiments of the present disclosure.

FIG. 6 is a flowchart illustrating a process of analyzing a redirected URL included in a message in an electronic device according to embodiments of the present disclosure.

Referring to FIGS. 1, 3A, and 6, the electronic device receives a message in operation 601. For example, receiving a message through the communication module 160, the electronic device may perform a control operation to execute the SMS/MMS application 373 and display, as shown in FIG. 9A, a message 903.

After receiving the message, the electronic device verifies whether an URL is included in the message in operation 603. For example, the electronic device may verify whether at least one of "http://", "https://", "ftp://", "irc://", "gopher://", "telnet://," "nntp://", and "worldwind://" is included in the message. Herein, the electronic device may include an URL detection module for verifying whether a URL is included in the message. If the URL is not included in the message, the electronic device may end the process of FIG. 6.

Alternatively, when the URL is included in the message, the electronic device attempts to access the URL in operation 605. For example, as shown in FIG. 9A, when a URL (http://short-url.ss) 907 is included in the content 905 of the message 903, the electronic device may receive an IP address corresponding to the "http://short-url.ss" 907 from a DNS and attempt to access the received IP address. Herein, the electronic device may include an Internet connecting unit for accessing the URL included in the message.

After attempting to access the URL, the electronic device verifies whether a redirection code is received in operation 607. After requesting an access to the "http://short-url.ss" 907, the electronic device may verify whether a "302" code is included in a received ACK message. Also, the electronic device may verify whether a code, for verifying that it is redirected, is included in the ACK message, in addition to the "302" code. Herein, the electronic device may include a URL redirection verifying unit for verifying whether the URL is redirected.

If the redirection code is received, the electronic device receives a final URL in operation 609. For example, when the "302" code is included in the ACK message of the "http://short-url.ss" 907, the electronic device may verify a final URL address in a destination item included in the ACK message.

Thereafter, the electronic device analyzes the URL in operation 611. For one example, when the redirection code is not received, the electronic device may verify whether the "http://short-url.ss" 907 or an IP address corresponding to the "http://short-url.ss" 907 is included in harmful site information stored in the memory 130 or the server 164. For another example, when the redirection code is received, the electronic device may determine whether a final URL of the "http://short-url.ss" 907 or an IP address corresponding to the final URL of the "http://short-url.ss" 907 is included in the harmful site information stored in the memory 130 or the server 164. Herein, the electronic device may include a URL analyzing unit for analyzing the URL.

Thereafter, the electronic device displays the result of analyzing the URL in operation 613. For one example, the electronic device may display, as shown in FIG. 9B, information indicating whether the URL 907 or the final URL of the URL 907 indicates a harmful site (see reference number 911). For another example, as shown in FIG. 9C, the electronic device may display information about the final URL of the URL 907 (see reference number 921). Herein, the electronic device may include a URL information providing unit for providing the result of analyzing the URL.

Thereafter, the electronic device ends the process of FIG. 6.

Figure 7:
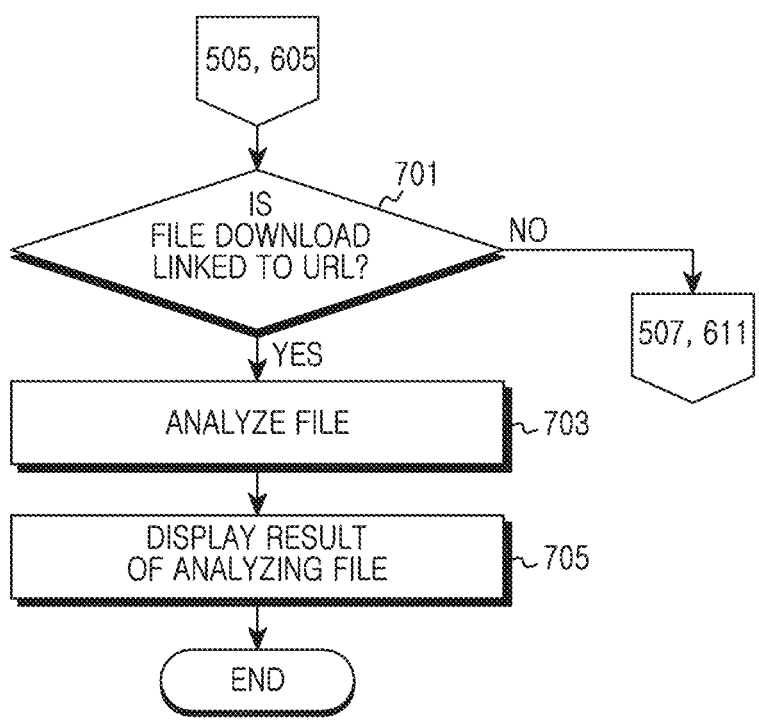
FIG. 7 is a flowchart illustrating a process of analyzing whether a URL included in a message is linked to a file download in an electronic device according to embodiments of the present disclosure.

FIG. 7 is a flowchart illustrating a process of analyzing whether a URL included in a message is linked to a file download in an electronic device according to embodiments of the present disclosure.

Referring to FIGS. 1 and 7, after attempting to access a URL (operation 505 or 605), the electronic device verifies whether a file download is linked to the URL in operation 701. For one example, the electronic device may verify whether a file download is linked to the URL with reference to a "content-type" included in a header of Multi-purpose Internet Mail Extensions (MIME). For another example, the electronic device may verify whether a "*.previously defined extension" is included in an ACK according to an URL access. If the file download is not linked to the URL, the electronic device may analyze the URL in operation 507 or 611. Also, when the file download is not linked to the URL, the electronic device may display, as shown in FIG. 9D, information indicating whether a file download is linked to the URL 907 (see reference number 931).

Alternatively, when the file download is linked to the URL, the electronic device analyzes a file in operation 703. For example, the electronic device may download a file to a partial area of the memory 130 temporarily and verify information of the file. Herein, the information of the file may include at least one of a name, a type, capacity, a made date, and a corrected date of the file. Herein, the electronic device may include a file analyzing unit for analyzing a file.

Thereafter, the electronic device displays the result of analyzing the file in operation 705. For example, the electronic device may display, as shown in FIG. 9E, information of a file linked to the URL 907 (see reference number 941). Herein, the electronic device may include a file information providing unit for providing the result of analyzing the file.

Figure 8:
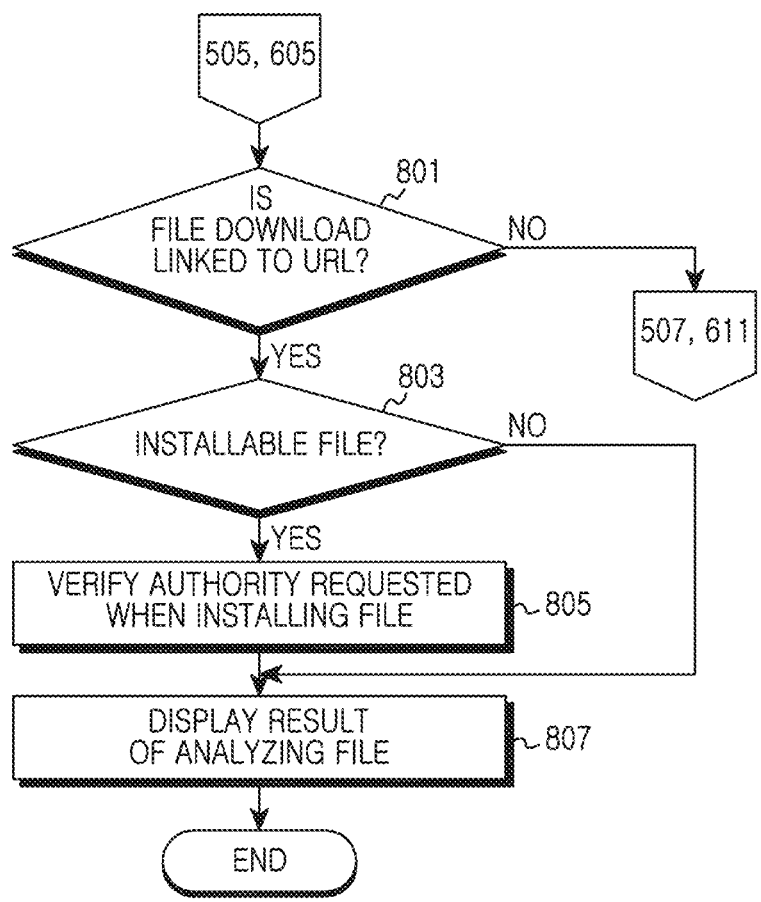
FIG. 8 is a flowchart illustrating a process of analyzing an authority requested when installing a file linked to a URL included in a message in an electronic device according to embodiments of the present disclosure.

FIG. 8 is a flowchart illustrating a process of analyzing an authority requested when installing a file linked to a URL included in a message in an electronic device according to embodiments of the present disclosure.

Referring to FIGS. 1 and 8, after attempting to access a URL (operation 505 or 605), the electronic device verifies whether a file download is linked to the URL in operation 801. For one example, the electronic device may verify whether a file download is linked to the URL with reference to a "content-type" included in a header of MIME. For another example, the electronic device may verify whether a "*.previously defined extension" is included in an ACK according to an URL access. If the file download is not linked to the URL, the electronic device may analyze the URL in operation 507 or 611. Also, when the file download is not linked to the URL, the electronic device may display, as shown in FIG. 9D, information indicating whether a file download is linked to the URL 907 (see reference number 931).

Alternatively, when the file download is linked to the URL, the electronic device verifies whether the file is an installable file in operation 803. For example, the electronic device may verify whether a "*.installable extension" is included in an ACK according to a URL access. For example, in the case of Android, the electronic device may verify whether a "*.extension" is included in an ACK.

When the file is an installable file, the electronic device verifies an authority requested when installing the file in operation 805. For example, the electronic device may download a file temporarily to a partial area of the memory 130 and verify an authority requested when installing the file. Herein, the electronic device may verify information of the file, which includes at least one of a name, a type, a capacity, a made date, and a corrected date of the file. For example, in case of a file of a "file.apk" format, the electronic device may analyze a "MANIFEST.XML" file included in the "file.apk" file and verify the authority requested when installing the file. For example, the authority requested when installing the file in "MANIFEST.XML" may be expressed such as "<uses-permission android: name=android.permission. request authority">". Not verifying the authority requested when installing the file through "MANIFEST.XML" analysis, the electronic device may install a downloaded file temporarily and verify the authority requested when installing the file. Herein, the electronic device may include a file analyzing unit for analyzing the file.

Thereafter, the electronic device displays the result of analyzing the file in operation 807. For one example, the electronic device may display, as shown in FIG. 9F, information about an authority requested when installing a file linked to the URL 907. For another example, the electronic device may display, as shown in FIG. 9D, information of a file linked to the URL 907 (see reference number 941). Herein, the electronic device may include a file information providing unit for providing the result of analyzing the file.

Thereafter, the electronic device ends the process of FIG. 8.

In above-described embodiments of the present disclosure, the electronic device analyzes the URL when the URL is included in the contents.

In other embodiments of the present disclosure, the electronic device may analyze a URL when selection of the URL included in contents is sensed.

In above-described embodiments of the present disclosure, the electronic device displays the result of analyzing the URL when the URL is included in the contents.

In other embodiments of the present disclosure, the electronic device may display a result of analyzing a URL when selection of the URL included in contents is sensed.

As describe above, the user of the electronic device may verify information corresponding to the URL before the electronic device is linked to the URL by detecting the URL included in the contents, analyzing the URL, and displaying the analyzed result.

Methods according to claims of the present disclosure or embodiments described in the specification of the present disclosure may be implemented as hardware, software, or a combination of hardware and software.

When the method is implemented by software, a computer-readable storage medium for storing one or more programs (software modules) may be provided. The one or more programs stored in the computer-readable storage medium are configured for being executed by one or more processors in an electronic device. The one or more programs include instructions for allowing an electronic device to execute the methods according to the claims of the present disclosure and/or the embodiments described in the specification of the present disclosure.

These programs (software module, software) may be stored in a random access memory (RAM), a non-volatile memory including a flash memory, a read only memory (ROM), an electrically erasable programmable ROM (EEPROM), a magnetic disc storage device, a compact disc-ROM (CD-ROM), a digital versatile disc (DVD) or an optical storage device of a different type, and a magnetic cassette. Or, the programs may be stored in a memory configured by combination of some or all of them. Also, the configured memory may include a plurality of memories.

Also, the programs may be stored in an attachable storage device capable of accessing an electronic device through each of communication networks such as the Internet, an intranet, a local area network (LAN), a wide LAN (WLAN), and a storage area network (SAN) or a communication network configured by combination of them. This storage device may connect to the electronic device through an external port.

Also, a separate storage device on a communication network may connect to a portable electronic device.

While the present disclosure has been particularly shown and described with reference to exemplary embodiments thereof, it will be understood by those skilled in the art that various changes in form and details may be made therein without departing from the spirit and scope of the present disclosure as defined by the appended claims.

What is claimed is:

1. A mobile communication terminal, comprising:
   a touch screen; and
   at least one processor configured to:
   display, in a sender information display region of a user interface for a messenger application executable within the mobile communication terminal, information regarding another mobile communication terminal,
   display, in a contents input region of the user interface for the messenger application, a message input box for displaying at least some of user inputs,
   identify a uniform resource locator in a received message,
   display a first object associated with the uniform resource locator in the received message, wherein the first object is confined within a message display area of the user interface for the messenger application, and wherein the first object is user-selectable,
   receive a user selection, on the touch screen, of the first object associated with the uniform resource locator, and
   in response to receiving the user selection of the first object associated with the uniform resource locator, control the messenger application to:
   receive information relating to the identified uniform resource locator from a server that serves the identified uniform resource locator,
   identify text information indicating the identified uniform resource locator based on the received information, and
   display, subsequent in time to displaying the first object, a second object comprising the identified text information, wherein the second object is confined within the message display area of the user interface for the messenger application.

2. The mobile communication terminal of claim 1, wherein the at least one processor is configured to verify whether at least one of "http://", "https://", "ftp://", "irc://", "gopher://", "telnet://", "nntp://", and "worldwind://" is included in the uniform resource locator to identify the uniform resource locator in the received message.

3. The mobile communication terminal of claim 1, wherein the at least one processor is further configured to check for the identified uniform resource locator in a harmful site database stored in a memory or a server.

4. The mobile communication terminal of claim 1, wherein the at least one processor is further configured to display a user selection input for the uniform resource locator in the message display area.

5. The mobile communication terminal of claim 1, wherein the at least one processor is configured to:
   verify whether the identified uniform resource locator has been redirected based on an acknowledgement message received in response to a connection request; and when the identified uniform resource locator has been redirected, receive information relating to a final uniform resource location associated with the redirected identified uniform resource locator.

6. The mobile communication terminal of claim 1, wherein the at least one processor is configured to:
verify whether a downloadable file is linked to the identified uniform resource locator;
temporarily download the downloadable file to a partial area of a memory and verify at least one property of the downloaded file; and
display a result comprising at least one verified property of the downloaded file.

7. The mobile communication terminal of claim 6, wherein the at least one property of the downloaded file comprises at least one of a name, a type, a capacity, a made date, or a corrected date of the downloaded file.

8. The mobile communication terminal of claim 6, wherein the at least one processor is configured to:
verify whether the downloaded file is an installable file;
verify a requested authority when installing the downloaded file; and
display a result comprising the requested authority.

9. The mobile communication terminal of claim 8, wherein the at least one processor is configured to temporarily install the downloaded file and verify the requested authority when installing the downloaded file.

10. The mobile communication terminal of claim 1, wherein the at least one processor is further configured to receive the information relating to the uniform resource locator from the server corresponding to the uniform resource locator by receiving information on a provider of the uniform resource locator.

11. The mobile communication terminal of claim 1, wherein the receiving information relating to the identified uniform resource locator from the server that serves the identified uniform resource locator comprises identifying a redirected uniform resource locator that is redirected from the identified uniform resource locator and receiving information from a server that serves the redirected uniform resource locator.

12. The mobile communication terminal of claim 1, wherein the first object is displayed in a first message bubble, and wherein, when the second object is displayed in a second message bubble adjacent to the first message bubble, the at least one processor is configured to display a third message bubble into which the first message bubble is, in a shape, changed.

13. The mobile communication terminal of claim 12, wherein the second message bubble in which the second object is displayed is a message bubble that points to the identified uniform resource locator.

14. The mobile communication terminal of claim 1, wherein, in receiving the information relating to the identified uniform resource locator, the at least one processor is configured to access a web page associated with the identified uniform resource locator, and acquire information of the identified uniform resource locator included in a header of the accessed web page.

15. The mobile communication terminal of claim 1, wherein the at least one processor is configured to display, as the first object, an object capable of receiving a user input regarding the identified uniform resource locator.

16. The mobile communication terminal of claim 1, wherein the at least one processor is configured to receive information relating to the uniform resource locator by receiving information from a server specified by the identified uniform resource locator.

17. The mobile communication terminal of claim 1, wherein the at least one processor is configured to:
identify the received uniform resource locator in the received message, wherein the received uniform resource locator is redirected to a final uniform resource locator,
display the first object associated with the received, redirected uniform resource locator in the received message,
in response to identifying the user selection of the first object associated with the uniform resource locator, receive information relating to a final uniform resource locator for the received, redirected uniform resource locator from a server corresponding to the final uniform resource locator, and
display the second object based on the received information relating to the final uniform resource locator.

18. A method, comprising:
displaying, in a sender information display region of a user interface for a messenger application executable within a mobile communication terminal, information regarding another mobile communication terminal;
displaying, in a content input region of the user interface for the messenger application, a message input box for displaying at least some of user inputs;
identifying a uniform resource locator in a received message;
displaying a first object associated with the uniform resource locator in the received message, wherein the first object is confined within a message display area of the user interface for the messenger application, and wherein the first object is user-selectable;
receiving a user selection of the first object associated with the uniform resource locator; and
in response to receiving the user selection of the first object associated with the uniform resource locator, controlling the messenger application to:
receive information relating to the identified uniform resource locator from a server that serves the identified uniform resource locator,
identify text information indicating the identified uniform resource locator based on the received information, and
display, subsequent in time to displaying the first object, a second object comprising the identified text information, wherein the second object is confined within the message display area of the user interface for the messenger application.

19. The method of claim 18, wherein receiving the information relating to the uniform resource locator from the server that serves the uniform resource locator further comprises receiving information on a provider of the uniform resource locator.

20. The method of claim 18, wherein receiving information relating to the uniform resource locator comprises receiving information from a server specified by the identified uniform resource locator.

* * * * *